(12) United States Patent
Qi et al.

(10) Patent No.: US 10,962,714 B2
(45) Date of Patent: Mar. 30, 2021

(54) APPARATUS AND METHOD FOR MONITORING CHANGE OF POLARIZATION STATE RESULTED FROM OPTICAL LINK AND OPTICAL RECEIVER

(71) Applicant: FUJITSU LIMITED, Kawasaki (JP)

(72) Inventors: Yanhui Qi, Beijing (CN); Tong Ye, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/786,017

(22) Filed: Feb. 10, 2020

(65) Prior Publication Data
US 2020/0264368 A1    Aug. 20, 2020

(30) Foreign Application Priority Data
Feb. 18, 2019    (CN) .......................... 201910119861.4

(51) Int. Cl.
| | |
|---|---|
| *G02B 6/126* | (2006.01) |
| *G02B 6/293* | (2006.01) |
| *G02B 6/27* | (2006.01) |
| *G02B 6/12* | (2006.01) |

(52) U.S. Cl.
CPC ........... *G02B 6/126* (2013.01); *G02B 6/2766* (2013.01); *G02B 6/29395* (2013.01); *G02B 2006/12116* (2013.01)

(58) Field of Classification Search
CPC .. G02B 6/126; G02B 6/29395; G02B 6/2766; G02B 2006/12116; H04B 10/0795
See application file for complete search history.

(56) References Cited

U.S. PATENT DOCUMENTS

| | | | | |
|---|---|---|---|---|
| 9,319,147 | B2* | 4/2016 | Xie | H04B 10/6162 |
| 9,515,743 | B2* | 12/2016 | Suzuki | H04B 10/65 |
| 10,742,316 | B2* | 8/2020 | Ye | H04B 10/616 |
| 2012/0002979 | A1* | 1/2012 | Xie | H04B 10/6162 |
| | | | | 398/208 |

* cited by examiner

*Primary Examiner* — John Bedtelyon
(74) *Attorney, Agent, or Firm* — Staas & Halsey LLP

(57) ABSTRACT

An apparatus and method for monitoring a change of a polarization state resulted from an optical link and optical receiver is provided. By combining zero-frequency response matrices and phase information on the received signal at two moments, a change matrix of the zero-frequency channel response matrices at the two moments is obtained, and a parameter characterizing a polarization state change induced by the optical link is determined according to the change matrix, which may dynamically monitor in real-time manner the polarization state change induced by the optical link, irrelevant to the polarization state of an input signal of the optical link. Due to the combination of the zero frequency response matrices and the phase information, response of the optical link may be completely reflected, for more accurate monitoring the polarization state. In addition, there is no need to add additional hardware and controls, thereby simplifying the structure and saving cost.

10 Claims, 3 Drawing Sheets

APPARATUS AND METHOD FOR MONITORING CHANGE OF POLARIZATION STATE RESULTED FROM OPTICAL LINK AND OPTICAL RECEIVER

CROSS-REFERENCE TO RELATED APPLICATIONS

This application is based on and hereby claims priority to Chinese Application No. 201910119861.4, filed Feb. 18, 2019, in the State Intellectual Property Office of China, the disclosure of which is incorporated herein by reference.

TECHNICAL FIELD

This disclosure relates to the field of communications technologies, and in particular to an apparatus and method for monitoring a change of a polarization state resulted from an optical link and an optical receiver.

BACKGROUND

Coherent optical communications systems play an important role in communications transmission networks due to their huge transmission bandwidths, great potentials for expansion, extremely low transmission loss, and low cost. In coherent optical communications, in order to ensure stable transmission of signals, an effective method is needed in an optical transceiver system to monitor and deal with various state changes of optical fibers in natural environments, such as bending, jitter, and being beaten. Research suggests that monitoring polarization changes is helpful to quickly response to, analyze of, and repair of such damages by an optical transceiver. That is, it is desirable to accurately reflect state changes of fibers in an optical link by monitoring changes of polarization states of signals in the optical link.

Currently, there are many different ways to monitor polarization states of signals. For example, a first method is a hardware-based method which monitors a change of a polarization state by using a DC laser and a commercial polarimeter or using two detectors and an optical rotator. A second method is based on digital signal processing by a receiver, in which a change of a polarization state in an optical link may be tracked at a faster speed in comparison with the first method.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided an apparatus for monitoring a change of a polarization state resulted from an optical link. The apparatus including a memory and a processor coupled to the memory where the processor is configured to: extract first equalization coefficients of taps of an equalizer performing equalization on a first signal received at a first moment and second equalization coefficients of the taps of the equalizer performing equalization on a second signal received at a second moment; perform summation on the first equalization coefficients of the taps of the equalizer to obtain a first response matrix at a zero frequency, and perform summation on the second equalization coefficients of the taps of the equalizer to obtain a second response matrix at the zero frequency. The processor is configured to: respectively extract phase information on the first signal and the second signal received at the first moment and the second moment to obtain a first transmission matrix of a phase response at the first moment and a second transmission matrix of a phase response at the second moment; determine a first channel response matrix according to the first response matrix and the first transmission matrix, and a second channel response matrix according to the second response matrix and the second transmission matrix; determine a change matrix of channel response matrices at the first moment and the second moment according to the first channel response matrix and the second channel response matrix; and determine, according to the change matrix, determine a parameter characterizing a change of a polarization state resulted from an optical link.

According to an embodiment of this disclosure, there is provided an optical receiver, including the apparatus for monitoring a change of a polarization state resulted from an optical link described in this disclosure.

According to an embodiment of this disclosure, there is provided a method for monitoring a change of a polarization state resulted from an optical link. The method including: extracting first equalization coefficients of taps of an equalizer performing equalization on a first signal received at a first moment and second equalization coefficients of the taps of the equalizer performing equalization on a second signal received at a second moment; and performing summation on the first equalization coefficients of the taps of the equalizer to obtain a first response matrix at a zero frequency, and performing summation on the second equalization coefficients of the taps of the equalizer to obtain a second response matrix at the zero frequency. The method includes respectively extracting phase information on the first signal and the second signal received at the first moment and the second moment to obtain a first transmission matrix of a phase response at the first moment and a second transmission matrix of a phase response at the second moment; determining a first channel response matrix according to the first response matrix and the first transmission matrix, and a second channel response matrix according to the second response matrix and the second transmission matrix; determining a change matrix of channel response matrices at the first moment and the second moment according to the first channel response matrix and the second channel response matrix; and determining, according to the change matrix, a parameter characterizing a change of a polarization state resulted from an optical link. With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
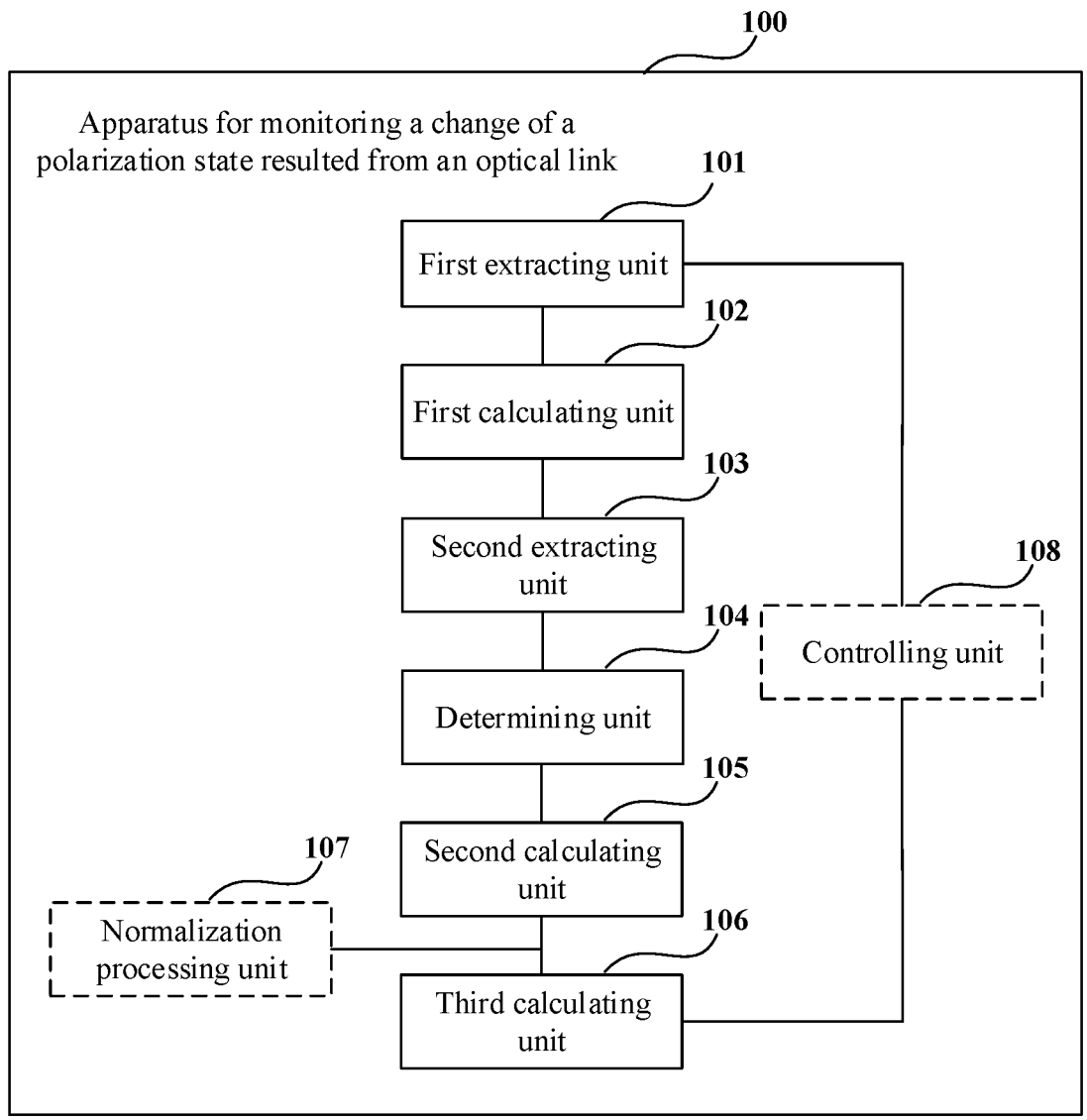
FIG. 1 is a schematic diagram of an apparatus for monitoring a change of a polarization state resulted from an optical link according to an embodiment of this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

It was found by the inventors that the above first method requires special hardware, which is high in cost and slow in detection speed, and is unable to quickly track a change in a polarization state in the optical link. While in the above second method, the obtained monitoring quantity is unable to purely reflect a change of a polarization state induced by a state change of a segment (such as a segment of an optical fiber) in the optical link, and influence of the polarization state of a signal inputted into the monitoring optical link segment is also included in the monitoring quantity, so it reflects an overall change of the polarization state of the optical link. Hence, it is unable to truly reflect the change of polarization state of a monitoring segment of the optical link.

Embodiments of this disclosure provide an apparatus and method for monitoring a change of a polarization state resulted from an optical link and optical receiver. By combining zero-frequency response matrices and phase information of the received signal at two moments, a change matrix of the zero-frequency channel response matrices at the two moments is obtained, and a parameter characterizing a polarization state change induced by the optical link is determined according to the change matrix, which may dynamically monitor in real-time manner the polarization state change induced by the optical link only, irrelevant to the polarization state of an input signal of the optical link. And due to the combination of the zero frequency response matrices and the phase information, response of the optical link may be completely reflected, so that a result of monitoring the polarization state is more accurate. In addition, there is no need to add additional hardware and controls, thereby simplifying the structure and saving cost.

An advantage of the embodiments of this disclosure exists in that by combining zero-frequency response matrices and phase information of the received signal at two moments, a change matrix of the zero-frequency channel response matrices at the two moments is obtained, and a parameter characterizing a polarization state change induced by the optical link is determined according to the change matrix, which may dynamically monitor in real-time manner the polarization state change induced by the optical link only, irrelevant to the polarization state of an input signal of the optical link. And due to the combination of the zero frequency response matrices and the phase information, response of the optical link may be completely reflected, so that a result of monitoring the polarization state is more accurate. In addition, there is no need to add additional hardware and controls, thereby simplifying the structure and saving cost.

Embodiment 1

The embodiment of this disclosure provides an apparatus for monitoring a change of a polarization state resulted from an optical link, which is disposed at an optical receiver end of an optical communications system.

FIG. 1 is a schematic diagram of the apparatus for monitoring a change of a polarization state resulted from an optical link of Embodiment 1 of this disclosure. As shown in FIG. 1, an apparatus 100 for monitoring a change of a polarization state includes:

a first extracting unit 101 configured to extract first equalization coefficients of taps of an equalizer performing equalization on a first received signal received at a first moment and second equalization coefficients of the taps of the equalizer performing equalization on a second received signal received at a second moment;

a first calculating unit 102 configured to perform summation on the first equalization coefficients of the taps of the equalizer to obtain a first response matrix at a zero frequency, and perform summation on the second equalization coefficients of the taps of the equalizer to obtain a second response matrix at the zero frequency;

a second extracting unit 103 configured to respectively extract phase information on the received signals at the first moment and the second moment to obtain a first transmission matrix of a phase response at the first moment and a second transmission matrix of a phase response at the second moment;

a determining unit 104 configured to determine a first channel response matrix according to the first response matrix and the first transmission matrix, and a second channel response matrix according to the second response matrix and the second transmission matrix;

a second calculating unit 105 configured to determine a change matrix of the channel response matrices at the first moment and the second moment according to the first channel response matrix and the second channel response matrix; and a third calculating unit 106 configured to, according to the change matrix, determine a parameter characterizing a change of a polarization state resulted from an optical link.

It can be seen from the above embodiment that by combining zero-frequency response matrices and phase information on the received signal at two moments, a change matrix of the zero-frequency channel response matrices at the two moments is obtained, and a parameter characterizing a polarization state change induced by the optical link is determined according to the change matrix, which may dynamically monitor in real-time manner the polarization state change induced by the optical link only, irrelevant to the polarization state of an input signal of the optical link. And due to the combination of the zero frequency response matrices and the phase information, response of the optical link may be completely reflected, so that a result of monitoring the polarization state is more accurate. In addition, there is no need to add additional hardware and controls, thereby simplifying the structure and saving cost.

In this embodiment, at the optical receiver end, the received signal may also be subjected to equalization, frequency offset compensation, optical transmitter non-ideal compensation, and bit error rate determination, etc., and related methods may be used for these processing.

In this embodiment, the first extracting unit 101 extracts the first equalization coefficients of the taps of the equalizer performing equalization on the first received signal received at the first moment and the second equalization coefficients of the taps of the equalizer performing equalization on the second received signal received at the second moment. For example, the first moment and the second moment at two moments having a time interval, and what is monitored by the apparatus 100 for monitoring a change of a polarization state is a change of a polarization state between the first moment and the second moment induced by the optical link.

In this embodiment, the equalizer may perform equalization on the received signal by using various algorithms.

For example, the equalizer uses a constant modulus algorithm (CMA) for equalization. Reference may be made to the related art for a particular process, which shall not be described herein any further.

In this embodiment, the first equalization coefficients may be expressed as $$\begin{bmatrix} w_{hh(n-1)} & w_{vh(n-1)} \\ w_{hv(n-1)} & w_{vv(n-1)} \end{bmatrix},$$

and the second equalization coefficients may be expressed as $$\begin{bmatrix} w_{hhn} & w_{vhn} \\ w_{hvn} & w_{vvn} \end{bmatrix};$$

where, h and v respectively denote a first polarization state and a second polarization state, n is a positive integer, a moment n−1 is the first moment, and a moment n is the second moment.

In this embodiment, the first calculating unit 102 performs summation on the first equalization coefficients of the taps of the equalizer to obtain the first response matrix at the zero frequency, and performs summation on the second equalization coefficients of the taps of the equalizer to obtain the second response matrix at the zero frequency.

For example, the first calculating unit 102 obtains the first response matrix and the second response matrix according to formulae (1) and (2) below:

$$M_{n-1} = \begin{bmatrix} W_{hh(n-1)} & W_{vh(n-1)} \\ W_{hv(n-1)} & W_{vv(n-1)} \end{bmatrix} = \begin{bmatrix} \Sigma w_{hh(n-1)} & \Sigma w_{vh(n-1)} \\ \Sigma w_{hv(n-1)} & \Sigma w_{vv(n-1)} \end{bmatrix}, \quad (1)$$

$$M_n = \begin{bmatrix} W_{hhn} & W_{vhn} \\ W_{hvn} & W_{vvn} \end{bmatrix} = \begin{bmatrix} \Sigma w_{hhn} & \Sigma w_{vhn} \\ \Sigma w_{hvn} & \Sigma w_{vvn} \end{bmatrix}; \quad (2)$$

where, $M_{n-1}$ denotes the first response matrix at the zero frequency, $M_n$ denotes the second response matrix at the zero frequency, $$\begin{bmatrix} w_{hh(n-1)} & w_{vh(n-1)} \\ w_{hv(n-1)} & w_{vv(n-1)} \end{bmatrix}$$

denotes the first equalization coefficients, $$\begin{bmatrix} w_{hhn} & w_{vhn} \\ w_{hvn} & w_{vvn} \end{bmatrix}$$

denotes the second equalization coefficients, h and v respectively denote the first polarization state and the second polarization state, n is a positive integer, a moment n−1 is the first moment, and a moment n is the second moment.

In this embodiment, the second extracting unit 103 respectively extracts phase information on the received signals at the first moment and the second moment to obtain the first transmission matrix of the phase response at the first moment and the second transmission matrix of the phase response at the second moment.

In this embodiment, the second extracting unit 103 may adopt various methods to extract the phase information.

For example, the second extraction unit 103 extracts the phase information on the received signals at the first moment and the second moment by using carrier phase recovery (CPR), respectively. Reference may be made to the related art for a particular extraction process, which shall not be described herein any further.

For another example, a frequency offset compensating/carrier recovering unit in the receiver extracts the phase information on the received signals at the first moment and the second moment by using carrier phase recovery, respectively. And the second extracting unit 103 acquires the phase information from the frequency offset compensating/carrier recovering unit.

For example, the first transmission matrix of the phase response at the first moment and the second transmission matrix of the phase response at the second moment are obtained by using the carrier phase recovery method, and are expressed by the formulae (3) and (4) below:

$$T_{n-1} = \begin{bmatrix} \exp(j\varphi_{h(n-1)}) & \\ & \exp(j\varphi_{v(n-1)}) \end{bmatrix}, \quad (3)$$

$$T_n = \begin{bmatrix} \exp(j\varphi_{h(n)}) & \\ & \exp(j\varphi_{v(n)}) \end{bmatrix}; \quad (4)$$

where, $T_{n-1}$ denotes the first transmission matrix of the phase response at the first moment, $T_n$ denotes the second transmission matrix of the phase response at the second moment, h and v respectively denote the first polarization state and the second polarization state, $\varphi_{h(n-1)}$ denotes the phase information on the received signal in the first polarization state at the first moment, $\varphi_{v(n-1)}$ denotes the phase information on the received signal in the second polarization state at the first moment, $\varphi_{h(n)}$ denotes the phase information on the received signal in the first polarization state at the second moment, $\varphi_{v(n)}$ denotes the phase information on the received signal in the second polarization state at the second moment, n is a positive integer, a moment n−1 is the first moment, and a moment n is the second moment.

In this embodiment, the determining unit 104 determines the first channel response matrix at the first moment according to the first response matrix and the first transmission matrix, and determines the second channel response matrix at the second moment according to the second response matrix and the second transmission matrix. In this way, as the zero-frequency response matrices and the phase information are combined, the response of the optical link may be completely reflected.

For example, the determining unit 104 multiplies an inverse matrix of the first response matrix by the first transmission matrix to obtain the first channel response matrix, and multiplies an inverse matrix of the second response matrix by the second transmission matrix to obtain the second channel response matrix.

For example, the first channel response matrix and the second channel response matrix may be obtained according to formulae (5) and (6) below:

$$W_{n-1} = M_{n-1}^{-1} T_{n-1} = \begin{bmatrix} W_{hh(n-1)} & W_{vh(n-1)} \\ W_{hv(n-1)} & W_{vv(n-1)} \end{bmatrix}^{-1} \begin{bmatrix} \exp(j\varphi_{h(n-1)}) & \\ & \exp(j\varphi_{v(n-1)}) \end{bmatrix}, \quad (5)$$

$$W_n = M_n^{-1} T_n = \begin{bmatrix} W_{hhn} & W_{vhn} \\ W_{hvn} & W_{vvn} \end{bmatrix}^{-1} \begin{bmatrix} \exp(j\varphi_{h(n)}) & \\ & \exp(j\varphi_{v(n)}) \end{bmatrix}; \quad (6)$$

where, $W_{n-1}$ denotes the first response matrix, $W_n$ denotes the second response matrix, $M_{n-1}$ denotes the first response matrix at the zero frequency, $M_n$ denotes the second response matrix at the zero frequency, $T_{n-1}$ denotes the first transmission matrix of the phase response at the first moment, $T_n$ denotes the second transmission matrix of the phase response at the second moment, $$\begin{bmatrix} W_{hh(n-1)} & W_{vh(n-1)} \\ W_{hv(n-1)} & W_{vv(n-1)} \end{bmatrix}$$

denotes the first equalization coefficients, $$\begin{matrix} W_{hhn} & W_{vhn} \\ W_{hvn} & W_{vvn} \end{matrix}$$

denotes the second equalization coefficients, h and v respectively denote the first polarization state and the second polarization state, $\varphi_{h(n-1)}$ denotes the phase information on the received signal in the first polarization state at the first moment, $\varphi_{v(n-1)}$ denotes the phase information on the received signal in the second polarization at the first moment, $\varphi_{h(n)}$ denotes the phase information on the received signal in the first polarization state at the second moment, $\varphi_{v(n)}$ denotes the phase information on received signal in the second polarization state at the second moment, n is a positive integer, a moment n−1 is the first moment, and a moment n is the second moment.

In this embodiment, the second calculation unit 105 determines the change matrix of the channel response matrices at the first moment and the second moment according to the first channel response matrix and the second channel response matrix.

For example, the second calculating unit 105 multiplies the second channel response matrix by an inverse matrix of the first channel response matrix to obtain the change matrix.

For example, the change matrix is obtained according to formula (7) below:

$$DW = W_n \cdot (W_{n-1})^{-1} \quad (7);$$

where, DW denotes the change matrix, $W_{n-1}$ denotes the first channel response matrix, and $W_n$ denotes the second channel response matrix.

In this embodiment, the apparatus 100 for monitoring a change of a polarization state may further include:

a normalization processing unit 107 configured to perform normalization processing on the change matrix.

For example, the normalization processing unit 107 may perform normalization processing on the change matrix by using formula (8) below:

$$DW' = DW/\sqrt{\det(DW)} \quad (8);$$

where, DW' denotes a normalized change matrix, DW denotes the change matrix, and det(DW) denotes calculation of a determinant of the change matrix.

In this embodiment, the normalization processing unit 107 is optional, and is shown by a dotted line frame in FIG. 1.

In this embodiment, in a case where the normalization processing unit 107 performs normalization processing on the change matrix, the third calculating unit 106 determines the parameter characterizing the change of the polarization state induced by an optical link according to the normalized change matrix.

For example, the third calculation unit 106 may determine the parameter characterizing the change of the polarization state induced by an optical link according to feature values of the change matrix or the normalized change matrix in a Stokes space.

In this embodiment, the parameter characterizing a change of a polarization state induced by an optical link may include at least one of a maximum polarization change, a maximum polarization rotation angle and a polarization change rate. For example, the maximum polarization change is a maximum polarization change of signal light in any polarization state inputted into the optical link induced by the optical link after the signal light passes through the optical link; the maximum polarization rotation angle is a maximum polarization rotation angle induced by the optical link to a polarization state of signal light in any polarization state inputted into the optical link after the signal light passes through the optical link; and the polarization change rate is a rotation rate of the maximum polarization rotation angle, that is, a rotation angle of the maximum polarization rotation angle along with time, its unit being, for example, krad/s.

For example, the third calculating unit 106 may calculate the maximum polarization change and the maximum polarization rotation angle by using formulae (9) and (10) below:

$$\text{MaxRot} = \sqrt{4 - 4\text{Re}(c)^2}, \quad (9)$$

$$pol.change = 2\arcsin\left(\frac{\text{MaxRot}}{2}\right); \quad (10)$$

where, MaxRot denotes the maximum polarization change, pol.change denotes the maximum rotation angle, and c denotes an element of a first row and a first column, or an element of a second row and the second column, of the change matrix or the normalized change matrix, or any combination of these two elements.

In this embodiment, the apparatus 100 for monitoring a change of a polarization state may further include:

a controlling unit 108 configured to control an interval between the first moment and the second moment, so that the maximum polarization rotation angle is kept within a preset range. That is, it is configured to dynamically control the interval between the first moment and the second moment according to a result of monitoring the maximum polarization rotation angle.

For example, an initial interval between the first moment and the second moment is determined. The maximum polarization rotation angle is monitored at the initial interval. when a monitored maximum polarization rotation angle is not within the preset range, the initial interval is adjusted so that the monitored maximum polarization rotation angle falls within the preset range.

In this way, by setting a reasonable time interval to keep the maximum polarization rotation angle within the preset range, it is possible to prevent a monitoring result from being affected by noises when the time interval is too small, and a monitoring result may be prevented from being inaccurate due to ignorance of details of the polarization change when the time interval is too large, thereby reducing an error in the monitoring result, and improving accuracy of the monitoring result.

Furthermore, by keeping the maximum polarization rotation angle within the preset range, the rotation speed of the maximum polarization rotation angle may be accurately estimated.

In this embodiment, the preset range may be set as actually demanded. For example, it is set according to a requirement for the error of the monitoring result.

For example, the preset range is 17 degrees to 180 degrees, such as 27 degrees. In this embodiment, the controlling unit 108 is optional, and is shown by a dotted line frame in FIG. 1.

In this embodiment, when the first extracting unit 101, the first calculating unit 102, the second extracting unit 103 and the determining unit 104 process the received signals at the first moment and the second moment, the received signal at the first moment may be sequentially processed first to obtain the first channel response matrix at the first moment, and then the received signal at the second moment are sequentially processed to obtain the second channel response matrix at the second moment. Alternatively, the first extracting unit 101 respectively extracts the first equalization coefficients at the first moment and the second equalization coefficients at the second moment, and then the first calculating unit 102 obtains the first response matrix and the second response matrix respectively through calculation; thereafter, the second extracting unit 103 obtains the first transmission matrix and the second transmission matrix through calculation; and finally, the determining unit 104 determines the first transmission matrix and the second transmission matrix, respectively. The above is only exemplary description of the processing of the units, and processing orders of the units are not unnecessarily limited in the embodiment of this disclosure.

It can be seen from the above embodiment that by combining zero-frequency response matrices and phase information on the received signal at two moments, a change matrix of the zero-frequency channel response matrices at the two moments is obtained, and a parameter characterizing a polarization state change induced by the optical link is determined according to the change matrix, which may dynamically monitor in real-time manner the polarization state change induced by the optical link only, irrelevant to the polarization state of an input signal of the optical link. And due to the combination of the zero frequency response matrices and the phase information, response of the optical link may be completely reflected, so that a result of monitoring the polarization state is more accurate. In addition, there is no need to add additional hardware and controls, thereby simplifying the structure and saving cost.

Embodiment 2

The embodiment of this disclosure provides an optical receiver, including the apparatus for monitoring a change of a polarization state described in Embodiment 1. Reference may be made to what is contained in Embodiment 1 for a particular structure and functions of the apparatus for monitoring a change of a polarization state, which shall not be described herein any further.

Figure 2:
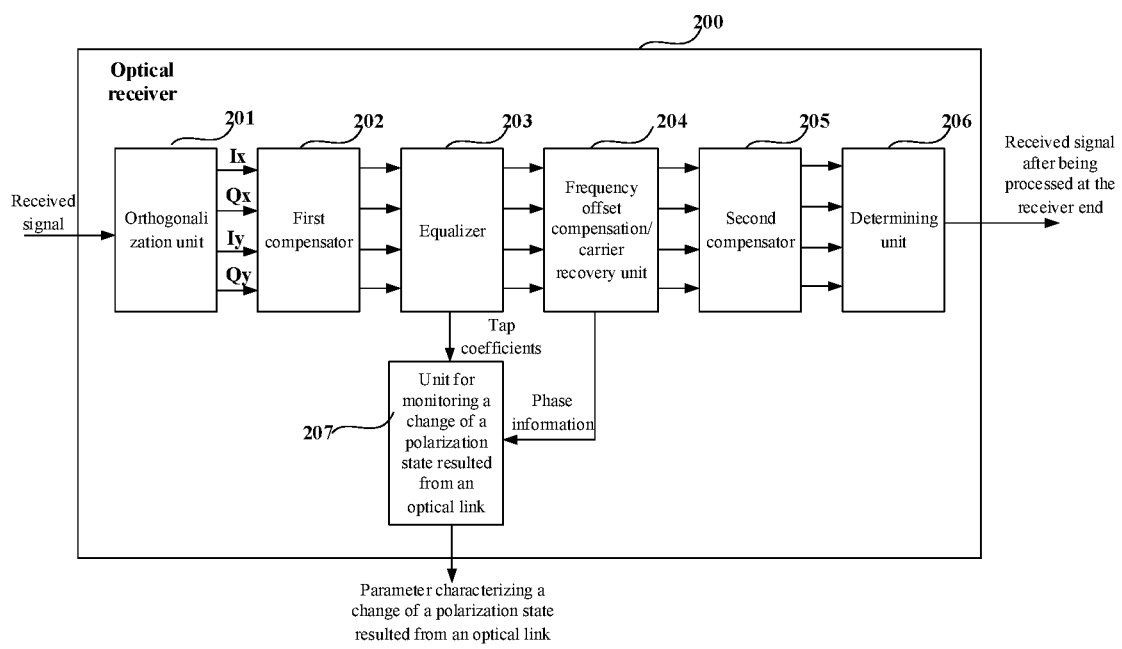
FIG. 2 is a block diagram of a systematic structure of an optical receiver according to an embodiment of this disclosure.

FIG. 2 is a block diagram of a systematic structure of the optical receiver of Embodiment 2 of this disclosure. As shown in FIG. 2, a receiver 200 includes an orthogonalization unit 201, a first compensator 202, an equalizer 203, a frequency offset compensation/carrier recovery unit 204, a second compensator 205, a determining unit 206 and a unit 207 for monitoring a change of a polarization state resulted from an optical link.

In this embodiment, reference may be made to the related art for particular structures and functions of the orthogonalization unit 201, the first compensator 202, the equalizer 203, the frequency offset compensation/carrier recovery unit 204, the second compensator 205 and the determining unit 206.

For example, the equalizer 203 is a constant modulus algorithm equalizer, and the frequency offset compensation/carrier recovery unit 204 extracts phase information by using carrier phase recovery.

In this embodiment, a particular structure and functions of the unit 207 for monitoring a change of a polarization state resulted from an optical link are the same as those of the apparatus 100 for monitoring a change of a polarization state in Embodiment 1, and reference may be made to Embodiment 1 for details.

As shown in FIG. 2, a received signal is inputted to the orthogonalization unit 201, the orthogonalization unit 201 decomposes the received signal into four channels of signals, an Ix-channel signal, a Qx-channel signal, an Iy-channel signal, and a Qy-channel signal, the first compensator 202 performs compensation on a receiver end damage according to a parameter of the receiver end damage, after being performed receiver end damage compensation, the received signal in inputted into the equalizer 203 for being performed adaptive equalization processing, after being performed equalization processing by the equalizer 203, the received signal is inputted into the frequency offset compensation/carrier recovery unit 204 for being performed frequency offset compensation and carrier recovery, the second compensator 205 performs compensation on a transmitter end damage according to a parameter of the transmitter end damage, after being performed transmitter end damage compensation, the received signal is inputted into the determining unit 206 for determination and then outputted, and the unit 207 for monitoring a change of a polarization state resulted from an optical link obtains response matrices at the two moments according to coefficients of taps of the equalizer 203 at the two moments, obtains transmission matrices at the two moments according to phase information extracted from the frequency offset compensation/carrier recovery unit 204, obtains channel response matrices and a change matrix thereof according to the response matrices and transmission matrices at the two moments, and determines a parameter characterizing a change of a polarization state resulted from an optical link according to the change matrix.

In this embodiment, the optical receiver 200 does not necessarily include all of the components shown in FIG. 2; and furthermore, the optical receiver 200 may include components not shown in FIG. 2, and reference may be made to related art.

In this embodiment, the functions of the unit 207 for monitoring a change of a polarization state resulted from an optical link may be carried out by a processor of the optical receiver, such as a digital signal processor (DSP) of the receiver.

It can be seen from the above embodiment that by combining zero-frequency response matrices and phase information of the received signal at two moments, a change matrix of the zero-frequency channel response matrices at the two moments is obtained, and a parameter characterizing a polarization state change induced by the optical link is determined according to the change matrix, which may dynamically monitor in real-time manner the polarization state change induced by the optical link only, irrelevant to the polarization state of an input signal of the optical link. And due to the combination of the zero frequency response matrices and the phase information, response of the optical link may be completely reflected, so that a result of monitoring the polarization state is more accurate. In addition, there is no need to add additional hardware and controls, thereby simplifying the structure and saving cost.

Embodiment 3

The embodiment of this disclosure provides a method for monitoring a change of a polarization state resulted from an optical link, which corresponds to the apparatus for monitoring a change of a polarization state resulted from an optical link in Embodiment 1.

Figure 3:
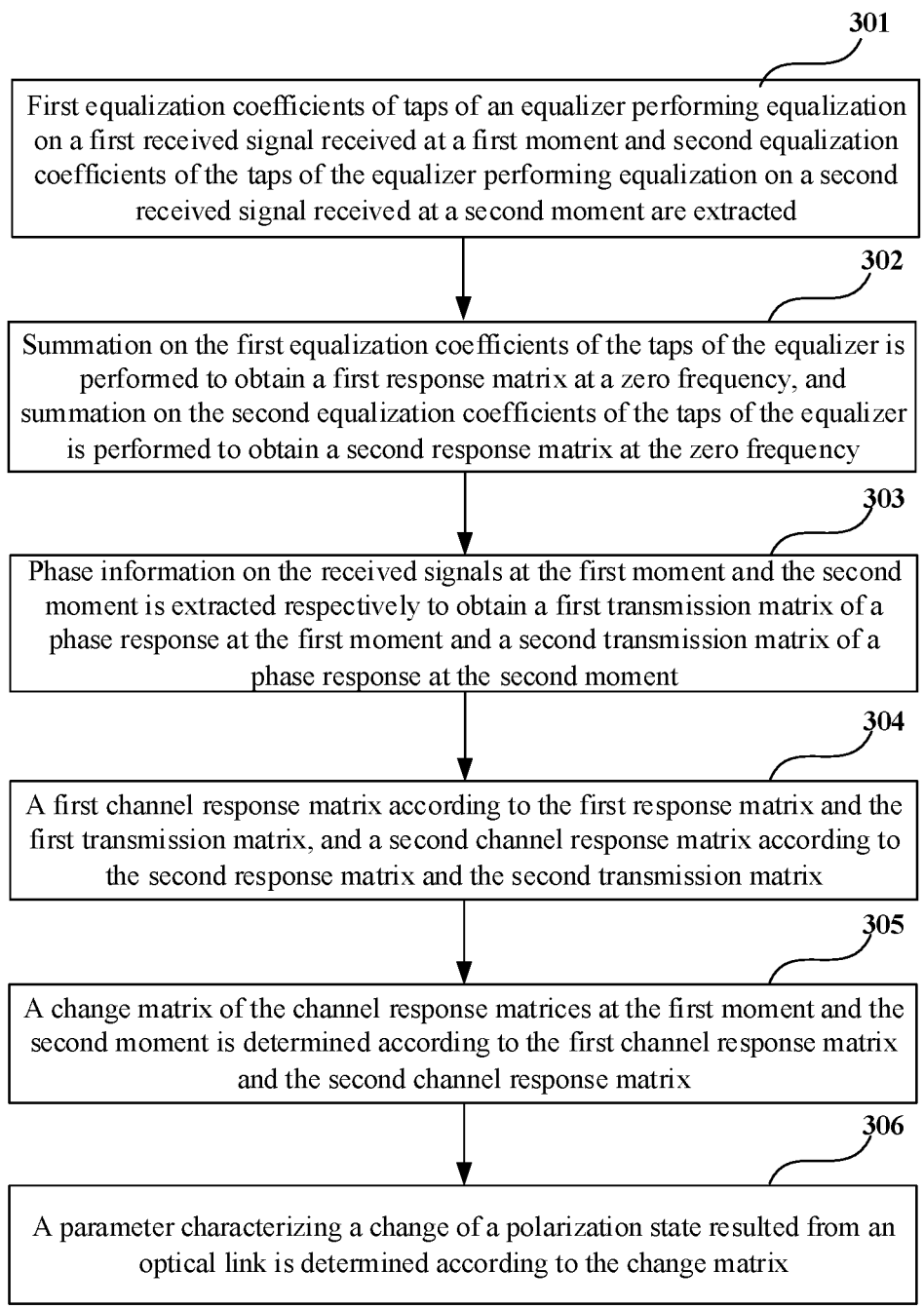
FIG. 3 is a flowchart of a method for monitoring a change of a polarization state resulted from an optical link according to an embodiment of this disclosure.

FIG. 3 is a flowchart of the method for monitoring a change of a polarization state resulted from an optical link of Embodiment 3 of this disclosure. As shown in FIG. 3, the method includes:

Operation 301: first equalization coefficients of taps of an equalizer performing equalization on a first received signal received at a first moment and second equalization coefficients of the taps of the equalizer performing equalization on a second received signal received at a second moment are extracted;

Operation 302: summation on the first equalization coefficients of the taps of the equalizer is performed to obtain a first response matrix at a zero frequency, and summation on the second equalization coefficients of the taps of the equalizer is performed to obtain a second response matrix at the zero frequency;

Operation 303: phase information on the received signals at the first moment and the second moment is extracted respectively to obtain a first transmission matrix of a phase response at the first moment and a second transmission matrix of a phase response at the second moment;

Operation 304: a first channel response matrix according to the first response matrix and the first transmission matrix, and a second channel response matrix according to the second response matrix and the second transmission matrix;

Operation 305: a change matrix of the channel response matrices at the first moment and the second moment is determined according to the first channel response matrix and the second channel response matrix; and Operation 306: a parameter characterizing a change of a polarization state resulted from an optical link is determined according to the change matrix.

In this embodiment, implementation of the functions of the units in Embodiment 1 may be followed for execution of the above operations (steps), which shall not be described herein any further.

It can be seen from the above embodiment that by combining zero-frequency response matrices and phase information on the received signal at two moments, a change matrix of the zero-frequency channel response matrices at the two moments is obtained, and a parameter characterizing a polarization state change induced by the optical link is determined according to the change matrix, which may dynamically monitor in real-time manner the polarization state change induced by the optical link only, irrelevant to the polarization state of an input signal of the optical link. And due to the combination of the zero frequency response matrices and the phase information, response of the optical link may be completely reflected, so that a result of monitoring the polarization state is more accurate. In addition, there is no need to add additional hardware and controls, thereby simplifying the structure and saving cost.

An embodiment of the present disclosure provides a computer readable program, which, when executed in an apparatus for monitoring a change of a polarization state resulted from an optical link or an optical receiver, will cause a computer to carry out the method for monitoring a change of a polarization state resulted from an optical link described in Embodiment 3 in the apparatus for monitoring a change of a polarization state resulted from an optical link or the optical receiver.

An embodiment of the present disclosure provides a computer storage medium, including a computer readable program, which will cause a computer to carry out the method for monitoring a change of a polarization state resulted from an optical link described in Embodiment 3 in an apparatus for monitoring a change of a polarization state resulted from an optical link or an optical receiver.

The method for monitoring a change of a polarization state resulted from an optical link carried out in the apparatus for monitoring a change of a polarization state resulted from an optical link or the optical receiver described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the operations shown in FIG. 3. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An apparatus for monitoring a change of a polarization state resulted from an optical link, the apparatus comprising:
   a memory;
   a processor coupled to the memory and configured to:
   extract first equalization coefficients of taps of an equalizer performing equalization on a first signal received at a first moment and second equalization coefficients of the taps of the equalizer performing equalization on a second signal received at a second moment;
   perform summation on the first equalization coefficients of the taps of the equalizer to obtain a first response matrix at a zero frequency, and perform summation on the second equalization coefficients of the taps of the equalizer to obtain a second response matrix at the zero frequency;
   respectively extract phase information on the first signal and the second signal received at the first moment and the second moment to obtain a first transmission matrix of a phase response at the first moment and a second transmission matrix of a phase response at the second moment;
   determine a first channel response matrix according to the first response matrix and the first transmission matrix, and a second channel response matrix according to the second response matrix and the second transmission matrix;
   determine a change matrix of channel response matrices at the first moment and the second moment according to the first channel response matrix and the second channel response matrix; and
   determine, according to the change matrix, a parameter characterizing a change of a polarization state resulted from an optical link.

2. The apparatus according to claim 1, wherein,
   the parameter characterizing the change of the polarization state resulted from the optical link comprises at least one of a maximum polarization change, a maximum polarization rotation angle and a polarization change rate, and the maximum polarization change is of signal light in any polarization state inputted into the optical link induced by the optical link after the signal light passes through the optical link,
   the maximum polarization rotation angle is induced by the optical link to a polarization state of signal light in any polarization state inputted into the optical link after the signal light passes through the optical link, and
   the polarization change rate is a rotation rate of the maximum polarization rotation angle.

3. The apparatus according to claim 2, wherein the apparatus further comprises:
   a controller configured to control an interval between the first moment and the second moment, so that the maximum polarization rotation angle is kept within a predetermined range.

4. The apparatus according to claim 1, wherein,
   the equalizer performs the equalization on at least one of the first signal and the second signal by using a constant modulus algorithm.

5. The apparatus according to claim 1, wherein,
   the processor respectively extracts the phase information on the first signal and the second signal received at the first moment and the second moment by using carrier phase recovery.

6. An optical receiver, comprising the apparatus as claimed in claim 1.

7. A method for monitoring a change of a polarization state resulted from an optical link, the method comprising:
   extracting first equalization coefficients of taps of an equalizer performing equalization on a first signal received at a first moment and second equalization coefficients of the taps of the equalizer performing equalization on a second signal received at a second moment;
   performing summation on the first equalization coefficients of the taps of the equalizer to obtain a first response matrix at a zero frequency, and performing summation on the second equalization coefficients of the taps of the equalizer to obtain a second response matrix at the zero frequency;
   respectively extracting phase information on the first signal and the second signal received at the first moment and the second moment to obtain a first transmission matrix of a phase response at the first moment and a second transmission matrix of a phase response at the second moment;

determining a first channel response matrix according to the first response matrix and the first transmission matrix, and a second channel response matrix according to the second response matrix and the second transmission matrix;

determining a change matrix of channel response matrices at the first moment and the second moment according to the first channel response matrix and the second channel response matrix; and determining, according to the change matrix, a parameter characterizing a change of a polarization state resulted from an optical link.

8. The method according to claim 7, wherein, the parameter characterizing the change of the polarization state resulted from an optical link comprises at least one of a maximum polarization change, a maximum polarization rotation angle and a polarization change rate, and the maximum polarization change is of signal light in any polarization state inputted into the optical link induced by the optical link after the signal light passes through the optical link, the maximum polarization rotation angle is induced by the optical link to a polarization state of signal light in any polarization state inputted into the optical link after the signal light passes through the optical link, and the polarization change rate is a rotation rate of the maximum polarization rotation angle.

9. The method according to claim 8, wherein the method further comprises:

controlling an interval between the first moment and the second moment, so that the maximum polarization rotation angle is kept within a predetermined range.

10. The method according to claim 7, wherein, the equalizer performs the equalization on at least one of the first signal and the second signal by using a constant modulus algorithm.

* * * * *